UNITED STATES PATENT OFFICE.

HOWARD W. MATHESON, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PROCESS OF COLLOIDING CARBOHYDRATE ESTERS AND PRODUCT THEREOF.

1,161,063. Specification of Letters Patent. Patented Nov. 23, 1915.

No Drawing. Application filed November 4, 1913, Serial No. 799,109. Renewed April 14, 1915. Serial No. 21,453.

*To all whom it may concern:*

Be it known that I, HOWARD W. MATHESON, of Wilmington, in the county of New Castle, and in the State of Delaware, have invented a certain new and useful Improvement in Processes of Colloiding Carbohydrate Esters and Products Thereof, and do hereby declare that the following is a full, clear, and exact description thereof.

My invention relates to the colloiding of carbon compounds such as carbohydrate esters and more particularly the nitrates of cellulose, for example pyroxylin, and to the product formed thereby.

My invention is applicable to many different industries, but it is particularly adapted for use in connection with the celluloid, artificial leather and photographic film industries. It is, however, especially valuable in connection with the celluloid industry and, for the purpose of illustration, I shall describe my invention more particularly with reference to said industry.

Hitherto, in the process of making celluloid, it has been customary to use camphor, together with a volatile solvent such as alcohol, in order to colloid the nitrocellulose. In such process it has been customary to remove the alcohol in the final steps of the process. The resulting product, therefore, containing practically only camphor and nitrocellulose, cannot be easily reworked and molded into the shape desired, owing to the fact that the melting point of champhor is above the point at which nitrocellulose decomposes. A further disadvantage is that camphor is somewhat volatile at ordinary temperatures, which is a source of difficulty in many industries in which celluloid is used.

The object of my invention is to provide a substitute for the camphor, wholly or in part, as a colloiding agent of carbohydrate esters such, for example, as nitrocellulose, as for example pyroxylin, so as to avoid the disadvantages connected with the use of camphor as a colloiding agent, and so as to provide a colloiding agent having many advantages in the process of producing celluloid over previous processes.

My invention is capable of being carried out in many different ways. In general, my invention comprises, however, the process and product of colloiding the compounds referred to by the application of an ester formed from an aromatic carboxylic acid and a phenol or the homologues thereof, or the substitution products of such compounds.

In general, my invention may comprise the application of phenolic esters of benzoic acid, substituted benzoic acid or homologues of the same. As examples of phenolic esters, I may use the esters formed from aromatic hydroxyl compounds such as phenol or cresol. By substituted benzoic acid, I may mean such bodies as chloro-benzoic acids, hydroxy-benzoic acids, etc. By homologues of benzoic acid or of substituted benzoic acid, I may mean such bodies as toluic acids, chloro-toluic acids, etc. As an example of such a colloiding agent, I may use, however, phenyl benzoate, which is a phenolic ester having the following formula:

$$C_6H_5COOC_6H_5$$

Inasmuch as phenyl benzoate is only slightly soluble in alcohol, the alcohol ordinarily used in the production of celluloid is replaced wholly or in part by another solvent or solvents such, for example, as acetone, ethyl acetate, etc. If desired, I may use instead, alcohol mixed with benzol or toluol, inasmuch as phenyl benzoate is soluble in such solvents.

As an illustrative example of the course of procedure, I may mix 75 parts of nitrocellulose with 25 parts of phenyl benzoate or with ten parts of phenyl benzoate and 15 parts or camphor, and the colloiding may be assisted by the addition of 100 parts of volatile solvent, comprising, for example, 40 parts of ethyl alcohol, 10 parts of acetone, and 50 parts of benzol. The volatile solvent is now removed in any desired manner, and the mass may be worked and molded in substantially the same manner as in working camphor celluloid, except that much lower temperatures are employed.

Phenyl benzoate has many advantages as a colloiding agent. It is a white, crystalline body melting at 70° C. and boiling at 314° C. Its low melting point enables a body of celluloid made by its use to be reworked and molded at a much lower temperature than camphor celluloid. At 60° C. the celluloid mass becomes quite plastic and, at this temperature, practically no decomposition of the nitrocellulose occurs. As its high boiling point indicates, phenyl benzoate is not volatile at ordinary temperatures, and this compound, therefore, has a marked advantage over camphor in this respect.

While I have mentioned particularly phenyl benzoate as a colloiding agent, I have made special reference to this compound merely because it can, at the present time, be more cheaply prepared than other similar compounds such, for example, as other phenolic benzoates.

While I have described my invention above in detail, I wish it to be understood that many changes may be made therein without departing from the spirit of my invention.

I claim:

1. The process which comprises colloiding a carbohydrate ester with a benzoic ester of one of the homologous series of phenols, of which phenol is a member.

2. The process which comprises colloiding a cellulose nitrate with a benzoic ester of one of the homologous series of phenols, of which phenol is a member.

3. The process which comprises colloiding pyroxylin with a benzoic ester of one of the homologous series of phenols, of which phenol is a member.

4. The process which comprises colloiding a carbohydrate ester with phenyl benzoate.

5. The process which comprises colloiding a cellulose nitrate with phenyl benzoate.

6. The process which comprises colloiding pyroxylin with phenyl benzoate.

7. The process which comprises colloiding a carbohydrate ester with a liquid comprising a benzoic ester of one of the homologous series of phenols, of which phenol is a member.

8. The process which comprises colloiding a cellulose nitrate with a liquid comprising phenyl benzoate.

9. The process which comprises colloiding a carbohydrate ester with a liquid comprising a benzoic ester of one of the homologous series of phenols, of which phenol is a member, and a volatile solvent.

10. The process which comprises colloiding a cellulose nitrate with a liquid comprising phenyl benzoate and a volatile solvent.

11. The process which comprises colloiding a carbohydrate ester with a liquid comprising a benzoic ester of one of the homologous series of phenols, of which phenol is a member, a volatile solvent and camphor.

12. The process which comprises colloiding a cellulose nitrate with a liquid comprising phenyl benzoate, a volatile solvent and camphor.

13. The process which comprises colloiding a carbohydrate ester with a liquid comprising a benzoic ester of one of the homologous series of phenols, of which phenol is a member, and a volatile solvent, and then removing the volatile solvent.

14. The process which comprises colloiding a cellulose nitrate with a liquid comprising phenyl benzoate and a volatile solvent, and then removing the volatile solvent.

15. The process which comprises colloiding a carbohydrate ester with a liquid comprising a benzoic ester of one of the homologous series of phenols, of which phenol is a member, a volatile solvent and camphor, and then removing the volatile solvent.

16. The process which comprises colloiding a cellulose nitrate with a liquid comprising phenyl benzoate, a volatile solvent and camphor, and then removing the volatile solvent.

17. A composition comprising a carbohydrate ester and a benzoic ester of one of the homologous series of phenols, of which phenol is a member.

18. A composition comprising a cellulose nitrate and a benzoic ester of one of the homologous series of phenols, of which phenol is a member.

19. A composition comprising pyroxylin and a benzoic ester of one of the homologous series of phenols, of which phenol is a member.

20. A composition comprising a carbohydrate ester and phenyl benzoate.

21. A composition comprising a cellulose nitrate and phenyl benzoate.

22. A composition comprising pyroxylin and phenyl benzoate.

23. A composition comprising a carbohydrate ester, phenyl benzoate and camphor.

24. A composition comprising a cellulose nitrate, phenyl benzoate and camphor.

25. A composition comprising pyroxylin, phenyl benzoate and camphor.

26. A composition of matter comprising a carbohydrate ester, a benzoic ester of one of the homologous series of phenols of which phenol is a member, and camphor.

27. A composition of matter comprising a cellulose nitrate, a benzoic ester of one of the homologous series of phenols, of which phenol is a member, and camphor.

28. A composition of matter comprising pyroxylin, a benzoic ester of one of the homologous series of phenols, of which phenol is a member, and camphor.

In testimony that I claim the foregoing I have hereunto set my hand.

HOWARD W. MATHESON.

Witnesses:
NATTE E. NEASLAND,
HAMILTON BRADSHAW.